United States Patent [19]

Bich et al.

[11] 4,429,007

[45] Jan. 31, 1984

[54] ELECTRICAL WIRE INSULATION AND ELECTROMAGNETIC COIL

[75] Inventors: George J. Bich, Penn Hills; Tapan K. Gupta, Monroeville, both of Pa.

[73] Assignee: The United States of America as represented by the United States Department of Energy, Washington, D.C.

[21] Appl. No.: 313,448

[22] Filed: Oct. 21, 1981

[51] Int. Cl.[3] .......................... C03C 3/10; H01B 3/08; H01B 7/00

[52] U.S. Cl. ...................................... 428/389; 106/52; 106/54; 174/110 R; 427/120; 427/226; 427/228; 427/374.7; 427/380; 523/170; 501/32; 501/64

[58] Field of Search .................... 174/110 R; 427/120, 427/226, 228, 374.7, 380; 428/389; 523/170

[56] References Cited

U.S. PATENT DOCUMENTS

| | | |
|---|---|---|
| 2,390,039 | 11/1945 | Slayter et al. . |
| 2,805,166 | 9/1957 | Loffler . |
| 3,012,092 | 12/1961 | Whearley et al. . |
| 3,030,257 | 4/1962 | Whearley et al. . |
| 3,059,046 | 10/1962 | Westerwelt et al. . |
| 3,273,225 | 9/1966 | Saums . |
| 3,325,590 | 6/1967 | Westerwelt et al. . |
| 3,490,984 | 1/1970 | Petticrew et al. . |
| 3,573,078 | 3/1971 | Bacon . |
| 3,784,384 | 1/1974 | Webb . |
| 3,867,758 | 2/1975 | Hohnson . |
| 3,960,579 | 6/1976 | Broemer et al. . |
| 4,012,263 | 3/1977 | Shell . |
| 4,088,023 | 5/1978 | Berleue et al. . |
| 4,102,692 | 3/1978 | Shell . |
| 4,238,705 | 12/1980 | Thomas . |

*Primary Examiner*—James C. Cannon

*Attorney, Agent, or Firm*—Kenneth R. Bowers

[57] ABSTRACT

An electromagnetic coil for high temperature and high radiation application in which glass is used to insulate the electrical wire. A process for applying the insulation to the wire is disclosed which results in improved insulation properties.

9 Claims, 5 Drawing Figures

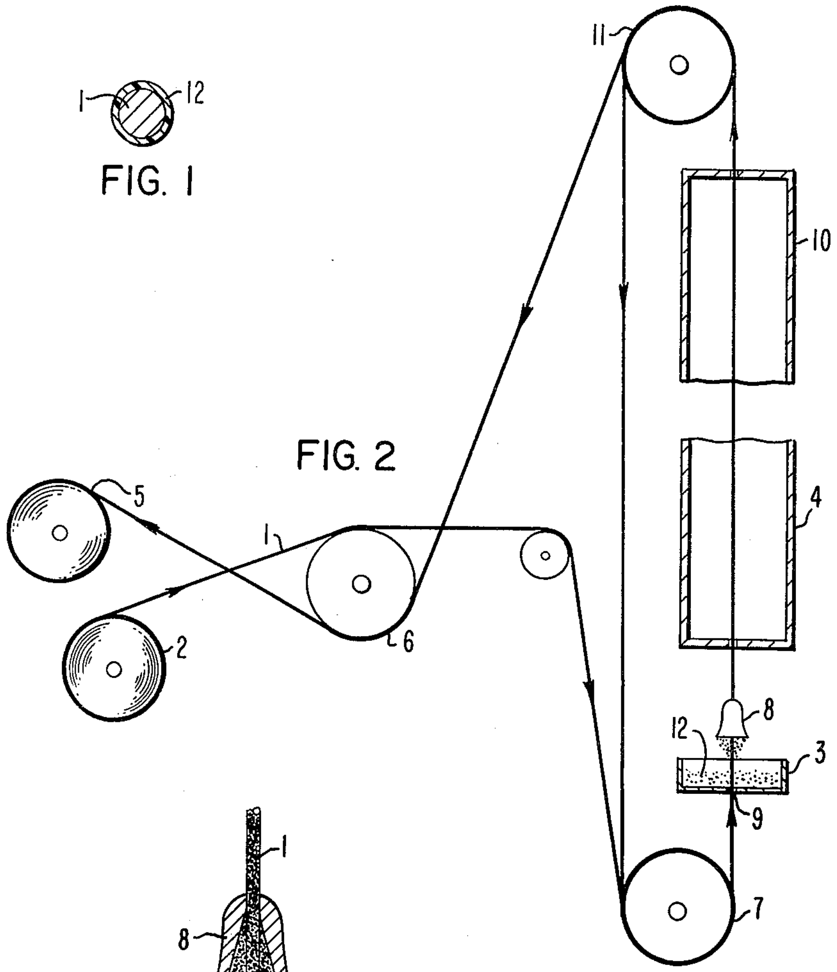
FIG. 1
FIG. 2
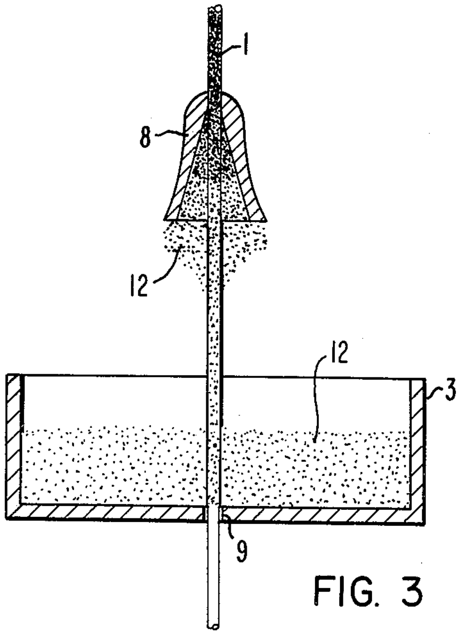
FIG. 3

ELECTRICAL WIRE INSULATION AND ELECTROMAGNETIC COIL

GOVERNMENT CONTRACT

This invention was conceived during performance of a contract with the United States Government designated DE-A-M-02-76-CH94000.

BACKGROUND OF THE INVENTION

1. Field of the Invention

This invention relates to improved glass insulation for electrical wire and to a process for producing the same. In particular, the invention relates to glass insulation suitable for use in electromagnetic coil wire used in the close vicinity of liquid metal cooled nuclear reactors, especially to lift and hold reactor safety rods.

A controllable electromagnet is one of the best means of maintaining safety and versatility in the operation of lifting and holding the safety rods on the top of a nuclear reactor core. The coil windings of the electromagnet must be flexible enough to wind into a suitable coil, must be fully insulated to eliminate turn-to-turn or turn-to-ground short circuit failures, and must be capable of exerting enough force to lift and hold the rod assembly even at elevated temperatures. To obtain this force, the coil must have sufficient turns of wire in the coil capable of providing a large current. The turns should be in close contact to reduce losses. For application to a liquid metal cooled reactor the insulation must withstand temperatures at 600° C. continuously, with possible temperature excursions as high as 750° C. Additionally, the coil should be a strong monolithic structure capable of withstanding electrical and vibrational forces as well as radiation doses of at least $10^7$ rads.

2. Description of the Prior Art

Many different materials are commonly used to coat or cover electrical wire for the purpose of providing electrical insulation. Insulation presently known to be prior art is generally unsuited for use in an environment of high temperature and high radiation and also in an application requiring the wire to be formed into sharply bending turns. Insulation sufficiently flexible to form tight bends in the electromagnet generally does not perform well during long term exposure to high temperatures and radiation. Insulation appropriate to high temperature and radiation is generally not suited to tight bending of the wire, since such blends may induce cracks, flaking or other defects in the insulation, causing electrical shorts.

Consequently, it is desired to provide insulation for electrical wire which insulation generally does not flake off, crack or otherwise fail when the wire is formed and utilized in tight bends such as those occurring in the windings of an electromagnet and which insulation has good long-term properties in both high temperature and radiation environments.

SUMMARY OF THE INVENTION

Briefly stated, three glass compositions have been discovered each of which when prepared and coated over wire by a specific process provide insulation having improved properties for application in a high temperature coil, especially for use near liquid metal nuclear reactors.

BRIEF DESCRIPTION OF THE DRAWINGS

FIG. 1 is a schematic of a coated wire in cross section;

FIG. 2 is a schematic of a wire coating operation;

FIG. 3 is a detail from FIG. 2;

DETAILED DESCRIPTION

Figure 4:
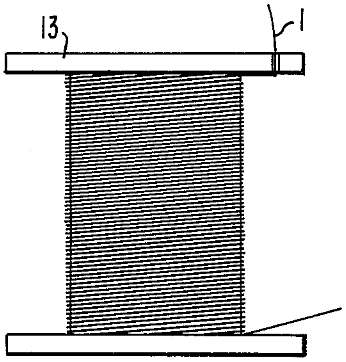
FIG. 4 is a schematic of an electromagnetic coil.

Three new glasses designated M3072, M3073, and M3074 have been discovered to chemically or otherwise become bonded to wire with sufficient and improved strength to meet the needs specified for high temperature insulation. The compositions of these three glasses are specified in Table I.

TABLE I

| Component | Range, Weight Percent | Preferred Weight Percent |
|---|---|---|
| | COMPOSITION OF M3072 GLASS | |
| $SiO_2$ | 40–60 | 55 |
| $Na_2O$ | 6–13 | 11 |
| $Al_2O_3$ | 2–6 | 4 |
| CaO | 3–10 | 6 |
| BaO | 15–25 | 20 |
| $Y_2O_3$ | 2–10 | 4 |
| | COMPOSITION OF M3073 GLASS | |
| $SiO_2$ | 40–60 | 55 |
| MgO | 6–13 | 9 |
| $Al_2O_3$ | 2–6 | 4 |
| CaO | 3–10 | 6 |
| BaO | 15–25 | 20 |
| $Y_2O_3$ | 2–10 | 6 |
| | COMPOSITION OF M3074 GLASS | |
| $SiO_2$ | 40–60 | 55 |
| BaO | 14–26 | 20 |
| $Na_2O$ | 3–12 | 6 |
| CaO | 3–12 | 6 |
| $B_2O_3$ | 2–7 | 5 |
| $Al_2O_3$ | 2–8 | 4 |
| $Y_2O_3$ | 2–10 | 4 |

PREPARATION OF GLASS INSULATION

The wire coating insulation is prepared as a mixture of four components: (1) a glass of one of the three compositions as disclosed in Table I, or a prior art glass such as Corning 7570 which is a low melting temperature glass (~600° C.) that contains a high percentage of PbO, $B_2O_3$ and $SiO_2$, and which is made by Corning Glass Corporation of Elmira, N.Y. (2) an inorganic filler, (3) an organic binder, and (4) an organic solvent.

The inorganic filler can be alumina, magnesia, zirconia, silica, or any refractory insulating oxide with a powder particle size of 1–10 microns. For the purposes of developmental testing, an alumina powder marketed by Alcoa designated as A-14 consisting of approximately 99% aluminum oxide ($Al_2O_3$) and the remaining 1% of residual metal oxides was used.

The organic binder may be one of several products marketed by Rohm and Haas Company. These binders are designated below the tradename and otherwise chemically identified. The preferred binder, acryloid B82, is a methyl methacrylate copolymer composed of polymethyl methacrylate

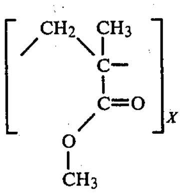

where X=number of monomers joined together reacted with a proprietary polymer to increase the flexibility and toughness of the resin.

Other organic binders that have been tried and were successful include Acryloid B-48N, which is also a acrylic polymer consisting of methyl methacrylate polymer reacted from the methyl methacrylate monomer.

Acryloid B48N is manufactured in a solvent containing the following ingredients:

| | weight % |
|---|---|
| Acrylic polymer | 45.0 |
| Residual monomer | 0.4 |
| Toluene (solvent) | 54.0 |
| 2-methoxyethanol | 1.0 |

This polymer gave a little more flexibility to the wire.

This solution was further diluted with xylene solvent before mixing with the glass ceramic of part B, which is described below.

Acryloid A21 was also used successfully as a binder in the high temperature insulation for wire. It is a methyl methacrylate polymer having the same general formula as the other binders. These binders are all of the acrylic family of methyl methacrylate. Doubtlessly, other binders could be substituted.

The organic solvent is any solvent in which the organic binder is soluble. In all developmental testing, it was xylene, a common aromatic solvent used in the enamel and varnish industries.

Initially, the above four components are prepared as two compositions called Part A and Part B herein. Part A is a mixture of the organic binder dissolved in the solvent. Part B is a mixture of one of the three glasses, ground or fritted into a powder, and the powdered inorganic filler. Part A is a liquid while Part B is a solid powder. The two Parts A and B are commingled using a three speed stainless steel Waring blender at high speed for from 2 to 5 minutes to produce a homogeneous slurry with the inorganic components held in suspension.

The proportions of each of the four components is as indicated in Table II.

TABLE II

| COMPOSITION OF SLURRY | |
|---|---|
| Glass Powder | 15-55 wt. % of solids |
| Inorganic Filler | 15-65 wt. % of solids |
| Organic Binder | 30-50 wt. % of solids |
| Organic Solvent | remainder |

Accordingly, the proportions of Parts A and B must be pre-planned to achieve the desired final proportions from Table II. A typical formulation is given in Table III. Part A for this formulation consists of 25 parts by weight of Acryloid B82 dissolved in 75 parts by weight of xylene.

TABLE III

| | TYPICAL FORMULATION | PPH | DESIRED COMPOSITION |
|---|---|---|---|
| Acryloid B82 | 320 gms. | 16.3 | 32 wt. % solids |
| Xylene [(320/0.25) × .75] | 960 gms. | 49.0 | — |
| Glass (M3073) | 480 gms. | 24.5 | 48 wt. % solids |
| Alumina ($Al_2O_3$) | 200 gms. | 10.2 | 20 wt. % solids |
| | 1960 gms. | 100.0 | 100 wt. % solids |

The sum of the solids content of the formulation in Table III, 1000 gms., divided by the total slurry weight of 1960 gms., yields a % solids weight of 51% in xylene. Usually the solids content is adjusted downward during the mixing in the blender to 45 to 50% solids by the addition of more xylene solvent to obtain a viscosity of the slurry of 500 to 1000 centipoises.

Testing and development activities have identified specific compositions of the slurry considered optimum for specific applications. These are disclosed in Table IV wherein use 1 relates to a high melting temperature insulation for high voltage and high magnetic flux electromagnetic coils, use 2 relates to a low melting temperature insulation, and use 3 is another high melting temperature insulation.

TABLE IV

| | | OPTIMUM COMPOSITIONS | | | |
|---|---|---|---|---|---|
| Use | Wire | Acryloid B82 | Glass | $Al_2O_3$ | Xylene |
| 1 | Nickel Clad Copper | 32% | (M3073) 48% | 20% | 55-60 pph |
| 2 | Nickel Clad Copper | 32% | (M3074) 40% | 28% | 55-60 pph |
| 3 | #32 AWG Gold | 32.5% | (M3073) 19.5% | 58% | 55-60 pph |

The "PPH" units are "parts per hundred" and correspond to a percent solids content.

Powdering procedures employed during preparation of the slurry will be described. The glass may be powdered by heating and quenching in cold water (called fritting) or by grinding by tumbling in a jar containing the glass, methanol, and a grinding aluminum ball for 24 hours followed by drying on an oven at 40°-60° C. for 12 hours.

WIRE COATING PROCESS

The glass slurry can be used to coat any metal wire but is specifically suited for use as insulation for gold, silver, nickel, and Inconel wire. The choice of the metal of the wire is dictated by the use contemplated.

Refer to FIG. 2. Wire 1 is coated in a conventional wire coating tower consisting of a wire payoff station 2, a coating pan 3 containing the slurry for coating wire 1, two curing ovens 4 (one shown) and a wire take-up station 5. The bare wire 1 is unreeled from payoff station 2 outward and over a variable speed capstan driven sheave 6. From the capstan driven sheave 6, wire 1 is run to a bottom sheave 7 of the coating tower. Wire 1 passes under the bottom sheave 7 and up through a slot 9 in the coating pan 3, which is attached to the tower. The slurry is applied to wire 1 as it travels through coating pan 3. The exact thickness of the coating is maintained by a die 8 which is attached to the top of the pan (see FIG. 3). The thickness of the coating is regulated by the size of the hole in the die through which the wire passes.

The wire 1, covered by the wet slurry continues to move upward and into the bottom oven 4 where the temperature is set at 320° C. Here the xylene solvent is evaporated and a film of Acryloid B82 is formed. Wire 1 continues up to top oven 10 where the temperature is set at 410° C. Here the Acryloid B82 binder containing the glass and ceramic fillers is completely cured to a hard flexible film. Wire 1 travels out of top oven 10 over the top sheaves 11 and down the back of the tower to the bottom sheaves 7 where it goes up through the coating pan again. From 3 to 4 cycles are made through the coating pan 3 and ovens 4 and 10 to ensure complete coating coverage of the bare wire 1 to the desired thickness. (Each pass has an individual die 8.). On the last pass, wire 1 travels back to the capstan drive 6 and take-up spool 5, where the coated wire 1 is collected. As an example, a coating of from 2.5 to 3.0 mils build on the diameter of the wire is accomplished by four passes on #18 AWG nickel-clad copper wire 1 using dies 8 with hole sizes of 0.043", 0.044", 0.045" and 0.046". This insulation thickness for the glass/ceramic and binder is optimum, since heavier films of >4.0 mils tend to flake off the wire, while smaller films build <1.5 mils tend to give poor quality insulation.

FIG. 1 is a cross section of a wire 1 showing the film 12 of insulation built around the wire.

WIRE INSULATION TESTING

After the wire is coated it may be tested to determine the physical and electrical properties of the insulation. The two main properties the insulation must possess are good flexibility and fair electrical strength. The flexibility is required if the wire is to be wound on a core of from 3" to 4" in diameter since the insulation must not crack or flake off the wire. The electrical strength is important in that it is desirable to have no direct electrical shorts from turn to turn or from the coil to ground.

To determine the flexibility, the wire may be elongated to various percentages of its original length and wound on a mandrel which is 5 times (5×) the diameter of the original wire. If the wire can sustain at least a 10% elongation plus a 5× mandrel wrap without flaking and cracking, the wire can withstand a coil wrapping operation.

Since the turn to turn coil voltage drop is very low (2-3 volts with an applied potential of 20 VDC), a voltage breakdown between insulated twisted pair of wires (IEEE 57) of 500 volts minimum will maintain the coil in operation with a large safety margin.

Table V discloses data relevant to two samples of nickel plated copper wire as coated by the indicated slurry with certain coating tower parameters. The above described wire insulation testing criteria were successfully achieved as indicated.

TABLE V

PHYSICAL AND ELECTRICAL PROPERTIES OF THE GLASS/CERAMIC COATINGS ON NICKEL PLATED COPPER WIRE

| | | | |
|---|---|---|---|
| Composition | Acryloid B82% | 30 | 32 |
| | M3073 glass % | 40 | 39 |
| | $Al_2O_3$% | 30 | 29 |
| Tower Temperature °C. | | 410/320 | 410/320 |
| Coating Speed, ft/min | | 30 | 30 |
| Die Sizes, mils | | 43, 44, 44, 45 | 43, 44, 44, 45 |
| Coating Condition | | Smooth | Smooth |
| Overall Diameter, mils | | 42.8 | 43.0 |
| Bare Wire Diameter, mils | | 40.0 | 40.0 |
| Coating Build, mils | | 2.8 | 3.0 |
| Elongation + 5× Mandrel | | 15% one failure; | 15% OK |
| Wrap | | 10% OK | |
| Electric Strength, volts | | 940, 860, 860 | 900, 840, 800 |

CONSTRUCTION OF THE MONOLITHIC COIL

An electromagnetic coil is constructed by winding the glass/ceramic, Acryloid B82 insulated wire 1 on a stainless steel spool 13 (see FIG. 4).

In order to maintain good insulation between the inner metal core 13 and the inner layer of the coil windings, the inside surface of the core 13 is flame sprayed (a common process) with an $Al_2O_3$ coating to a thickness of from 3 to 5 mils. The insulated wire 1 is wound on the insulated core 13 and an inorganic potting compound ($Al_2O_3$) is brushed between each layer to a thickness of approximately 5 mils. A final brushing of the compound was made on the outer layer to completely cover the windings. Cerama-dip 538, a tradename for a high temperature coating and sealing compound manufactured by Aremco Products, Inc., of Ossining, N.Y., may be used as the potting compound.

The coil is air dried and fired in a kiln to remove all trace of moisture and the Acryloid B82 organic binder and finally vitrify the glass frit at the high temperature.

The firing schedule for the coil is as follows in Table VI:

TABLE VI

Coil Firing Schedule

Rate of Rise—2° C./minute or less 1. 6 hours at room temperature (to dry out the water and set potting compound)
2. 16 hours at 100° C. (to slowly vaporize all residual moisture)
3. 8 hours at 125° C.
4. 16-20 hours at 370°-375° C. (to reduce the Acryloid to the monomer state and vaporize the monomer)
5. 4 hours at 450° C. (to eliminate any carbonaceous material that could be formed by the lack of air when heating the organic material)
6. 8-10 hours at 750° C. to vitrify the glass (8-10 hour @ 790° C. for M3073 glass)
7. 16 hours at 450° C. (to condition the coil)
8. Cool to room temperature slowly.

Step 4 of Table IV is of particular importance. The use of an organic binder convertible to a volatile monomer enables the elimination of this material from the coil. Otherwise, harmful carbonaceous residue can become an integral part of the coil, possibly causing electrical shorts or reduced allowable voltages due to arcing. Additionally, such deposits enhance mechanical degradation of the coil due to abrasion when severe mechanical vibrations exist in the environment.

In order to prove that the arcylic resin Acryloid B82 can be converted to the monomer and burn off cleanly leaving little or no residue containing no carbon, the following test was performed:

A ten gram sample of Acryloid B82 was placed in an aluminum dish and set in the kiln which was at room temperature. The temperature was permitted to rise at the same rate as for the coil ~2° C./min. The temperature was held at 375° C. for 16 hours. After cooling down the oven, the aluminum dish was removed and examined for residue. The aluminum dish was perfectly clean with no traces of residue.

After the coil has been fired and removed from the kiln the leads may be further insulated with ceramic leads to given them added flexibility. The coil is then placed in a stainless steel can. Before the can is sealed, the can is heated to the operating temperature of the coil and any off gasses still remaining are monitored and identified by passing the vapors through a gas chromatography analysis. When no more gas emissions are present, the can is hermetically sealed and the coil is ready for use.

SIMULATED TEST COILS

Eight coils using Corning 7570 glass or Westinghouse M3074 glass frits (powders) with the alumina ($Al_2O_3$) as the primary wire insulation have been constructed.

These coils differed from a standard coil by having the ends of the winding of each layer cut and used as the leads. For test purposes, these coils were constructed of four layer windings with four leads extending from each end of the coil with a total of eight leads. With this configuration, the insulation resistance was measured from layer to layer and from each layer to ground.

Figure 5:
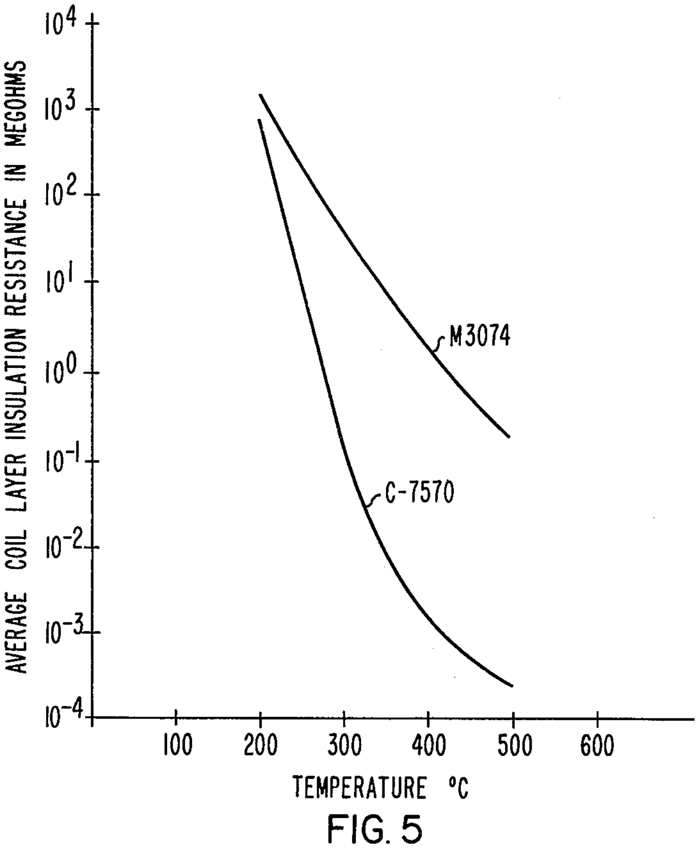
FIG. 5 is a graph of coil resistance versus temperature for various glass insulations.

For the layer to layer measurements, each layer was measured against every other layer in the coil to give all possible layer resistance measurements. For the test coils containing four leads, the total number of measurements was six. These resistance measurements were made at various temperatures and an average value at each temperature was calculated. FIG. 5 shows the results of the insulation resistance vs. temperature for two coils containing Corning 7570 glass frit and the Westinghouse M3074 glass encapsulated with the Cerama dip 538 potting compound. Similar test measurements with the M3073 glass have also been completed and are better than the M3074 glass.

FUTURE TESTING

The next time a nickel clad wire is prepared with the glass/ceramic material, it is intended to mix a few tenths of a percent (0.2% to 0.5%) of a polyethylene emulsion in with the slurry in a separate pan in coating the last pass. This should accomplish two things: (1) put a very slight polyethylene coating on the exterior of the glass insulation to reduce water absorption by the glass-/ceramic; and (2) increase the slipperiness of the insulation so that it will not scrape off the wire easily when pulled over sharp edges.

We claim:

1. An insulated electrical conductor comprising, in combination, a metallic conductor and an insulating coating applied to the metallic conductor, the coating having been derived by applying to the conductor a liquid slurry comprising:

(A) 15–55 solids weight percent a glass powder having a composition of:
 40–60 wt.% $SiO_2$;
 6–13 wt.% $Na_2O$;
 2–6 wt.% $Al_2O_3$;
 3–10 wt.% CaO;
 15–25 wt.% BaO; and
 2–10 wt.% $Y_2O_3$;

(B) 15–65 solids weight percent an inorganic filler selected from the group consisting of alumina, magnesia, zirconia or silica;

(C) 30–50 solids weight percent of an organic binder; and (D) sufficient organic solvent to dissolve the organic binder;

and by exposing said coated conductor to heat whereby said solvent and said organic binder are evaporated and further heating said conductor causing said coating to adhere to said conductor.

2. An insulated electrical conductor comprising, in combination, a metallic conductor and an insulating coating applied to the metallic conductor, the coating having been derived by applying to the conductor a liquid slurry comprising:

(A) 15–55 solids weight percent a glass powder having a composition of:
 40–60 wt.% $SiO_2$;
 6–13 wt.% MgO;
 2–6 wt.% $Al_2O_3$;
 3–10 wt.% CaO;
 15–25 wt.% BaO; and
 2–10 wt.% $Y_2O_3$;

(B) 15–65 solids weight percent an inorganic filler selected from the group consisting of alumina, magnesia, zirconia or silica;

(C) 30–50 solids weight percent of an organic binder; and (D) sufficient organic solvent to dissolve the organic binder;

and by exposing said coated conductor to heat whereby said solvent and said organic binder are evaporated and further heating said conductor causing said coating to adhere to said conductor.

3. An insulated electrical conductor comprising, in combination, a metallic conductor and an insulating coating applied to the metallic conductor, the coating having been derived by applying to the conductor a liquid slurry comprising:

(A) 15–55 solids weight percent a glass powder having a composition of:
 40–60 wt.% $SiO_2$;
 14–26 wt.% BaO;
 3–12 wt.% $Na_2O$;
 3–12 wt.% CaO;
 2–7 wt.% $B_2O_3$;
 2–8 wt.% $Al_2O_3$; and
 2–10 wt.% $Y_2O_3$;

(B) 15–65 solids weight percent an inorganic filler selected from the group consisting of alumina, magnesia, zirconia or silica;

(C) 30–50 solids weight percent of an organic binder; and (D) sufficient organic solvent to dissolve the organic binder;

and by exposing said coated conductor to heat whereby said solvent and said organic binder are evaporated and further heating said conductor causing said coating to adhere to said conductor.

4. The electrical conductor of claim 1, 2 or 3 wherein the organic binder is a liquid copolymer which reduces on being heated to a volatile monomer.

5. The electrical conductor of claim 1, 2 or 3 wherein the organic binder is a polymer derived from methyl methacrylate.

6. The electrical conductor of claim 1, 2 or 3 wherein the organic solvent is xylene.

7. An electromagnetic coil in which the electrical conductor used is that as described in claim 1, 2, or 3.

8. An electromagnetic coil having insulated electrical conductor wire as described in claim 1, 2 or 3 wherein adjacent layers of said coil are separated by a potting compound.

9. A process for the preparation of a conductor as described by claim 1, 2 or 3 which process is substantially:

(A) maintaining the slurry coated conductor at room temperature for 6 hours to dry out water and to allow the potting compound to dry;

(B) heating the conductor at 2° C. per minute or less to 100° C. to vaporize all residual moisture;

(C) maintaining said conductor at 100° C. for 16 hours;

(D) heating said conductor at 2° C. per minute or less to 125° C.;

(E) maintaining said conductor at 125° C. for 8 hours;

(F) heating said conductor at 2° C. per minute or less to a temperature between 370° to 375° C. to reduce the organic binder to the monomer state and to vaporize the monomer;

(G) maintaining said conductor at 370° to 375° C. for 16 to 20 hours;

(H) heating said conductor at 2° C. per minute or less to 450° C.;

(I) maintaining said conductor at 450° C. for 4 hours to eliminate any carbonaceous material present;

(J) heating said conductor to 750° C. to 790° C. at 2° C. per hour or less;

(K) maintaining said conductor at 750° C. to 790° C. for 8 to 10 hours to vitrify the glass;

(L) cooling said conductor to 450° C.;

(M) maintaining said conductor at 450° C. for 16 hours; and (N) cooling said conductor to room temperature.

* * * * *